(Model.)
R. P. SCOTT.
APPLE PARER, CORER, AND SLICER.
No. 283,030. Patented Aug. 14, 1883.
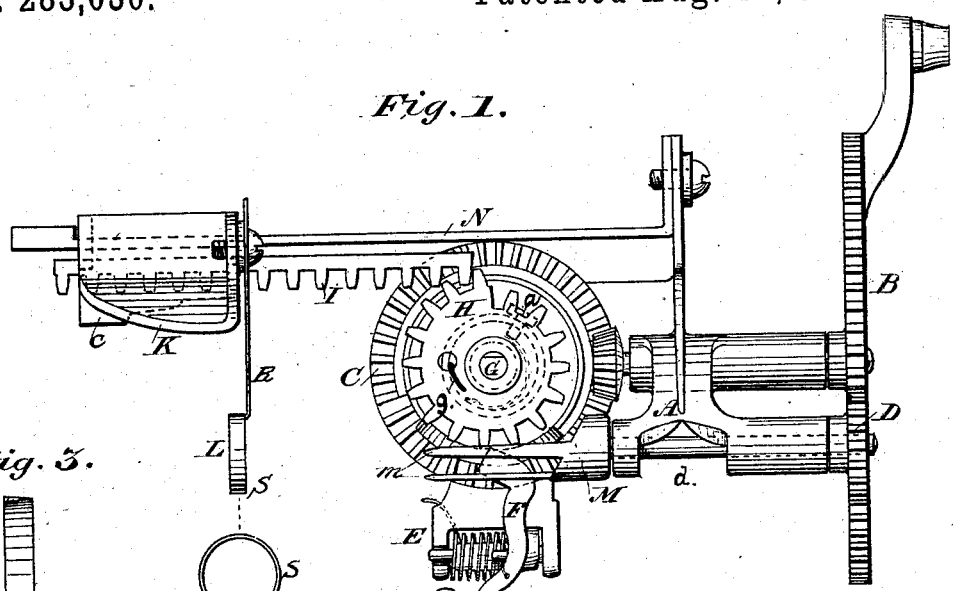
Fig. 1.
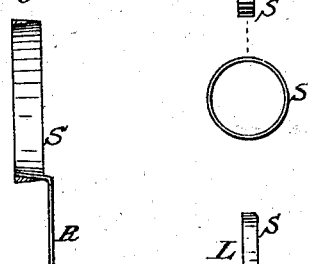
Fig. 3.
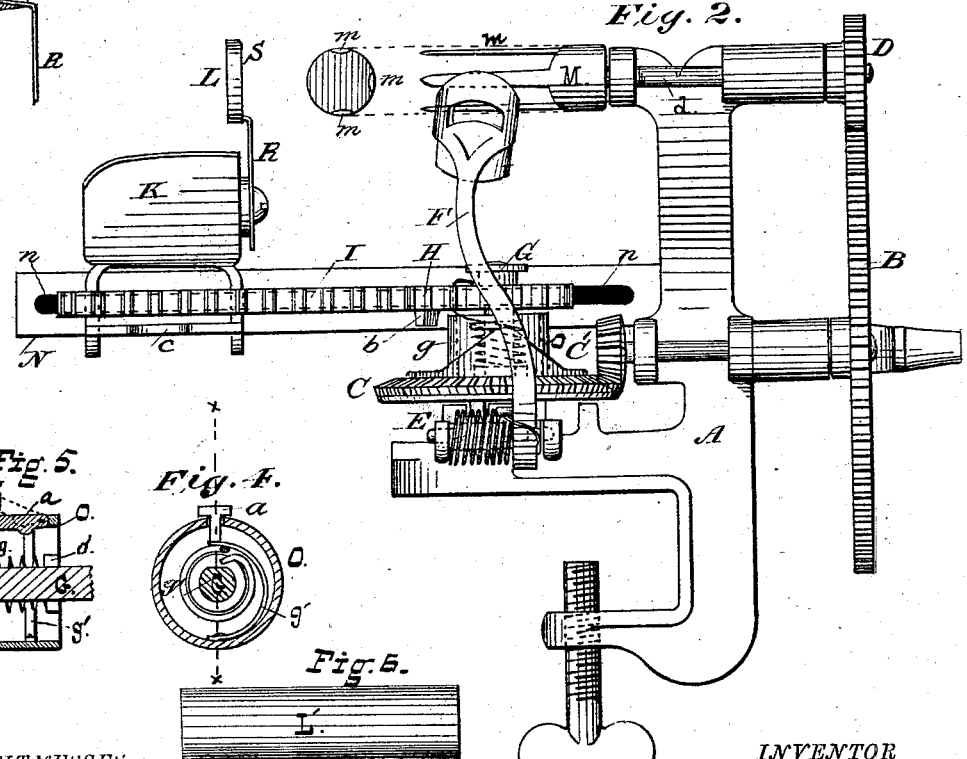
Fig. 2.
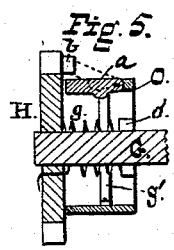
Fig. 5.
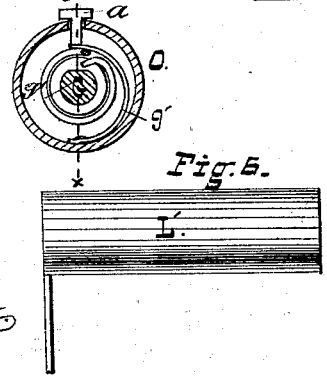
Fig. 4.
Fig. 6.
WITNESSES
T. C. Brecht
Geo. H. Pistel
INVENTOR
R. P. Scott (Model.)

R. P. SCOTT.
APPLE PARER, CORER, AND SLICER.

No. 283,030. Patented Aug. 14, 1883.

2 Sheets—Sheet 2.

WITNESSES
T. C. Brecht
D. F. Keleher

INVENTOR
R. P. Scott

UNITED STATES PATENT OFFICE.

ROBERT P. SCOTT, OF BALTIMORE, MARYLAND, ASSIGNOR TO THE SCOTT MANUFACTURING COMPANY, OF SAME PLACE.

APPLE PARER, CORER, AND SLICER.

SPECIFICATION forming part of Letters Patent No. 283,030, dated August 14, 1883.

Application filed June 26, 1882. (Model.)

*To all whom it may concern:*

Be it known that I, ROBERT P. SCOTT, a citizen of the United States, residing at Baltimore city, State of Maryland, have invented a new and useful Apple Paring, Coring, and Slicing Machine, of which the following is a specification.

The invention relates to that class of machines for paring, coring, and slicing apples, the object being to produce a machine that will accomplish the aforesaid work in a superior and more expeditious manner.

The invention consists, mainly, in the arrangement and manner of operating a coring and slicing device, and combining the same with that class of parers commonly recognized in the market as the "turn-table;" secondly, in a new construction of fork for holding the apple; thirdly, in a particular construction of the coring and slicing knife.

Figure 7:
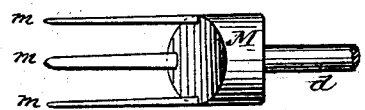
Figure 8:
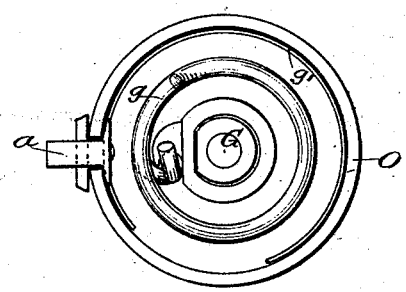
Figure 9:
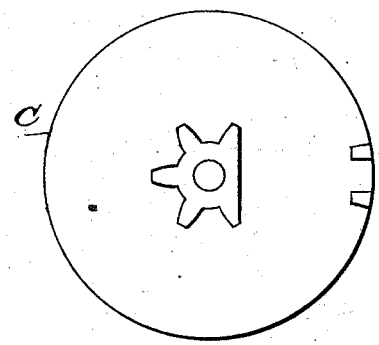
Figure 10:
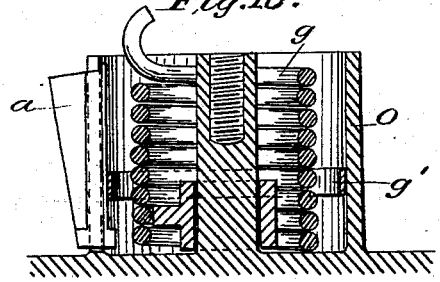
Figure 11:
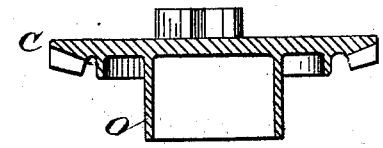

In the drawings, Figure 1 is a plan view of my machine. Fig. 2 is a side elevation of same. Fig. 3 is an enlarged cross-section of coring and slicing knife. Figs. 4 and 5 are sections of the raised cylinder portion of table-wheel C. Fig. 6 is a detailed view of a coring-tube. Fig. 7 is a detached view of fork M m m m. Fig. 8 is a top or plan view of table-wheel C, showing raised cylinder O, springs, and dog. Fig. 9 is under side of table-wheel C. Figs. 10 and 11 are sections of table-wheel C, showing raised cylinder O, springs g g', and dog a.

The especial style of machine to which I attach my improvements is that pattern of the turn-table patented by E. P. Monroe, March 24, 1868, which has parts corresponding to those in my machine designated by frame A, Figs. 1 and 2, driving-wheel B, pinion D, fork-shaft d, pinion C', table-wheel C, pin-support G, back gear, E, knife-arm and knife F f, none of which form any part of this invention, except in combination. The back gear, E, is arranged to work on the opposite side of the table-wheel C from that shown in the Monroe patent, in order to pare the apple, commencing at the outer end and paring toward the stem, instead of commencing at the stem. The old way of commencing at the stem is that shown in the patent of Monroe, above mentioned, and that of Browne, September 9, 1856, No. 15,683. The back gear, E, is also shown in the Browne patents.

It will be observed throughout the following description that the parts claimed as new in my invention are equally applicable, by slight changes in mechanical arrangement, to any of the parers having a revolving table-wheel—in fact, to almost any of the geared parers—as contrasted with the common means of operating a spiral slicer by a screw. A raised shell or cylinder extending from wheel C incloses a spring, g. I journal loosely upon the pin G a cam-shaped spur-wheel, H, which is carried around by means of the table-wheel C and auxiliary mechanism, hereinafter described, and reversed by the spring g, said spring having one end attached to the cam-shaped spur-wheel H, and the other to a collar, o, made fast to pin G. Wheel H gears into a rack-bar, I, which is attached to a knife-carriage, K, which latter reciprocates upon a guide-bar, N, the said bar N being an extension of the supporting-frame A. A dog, a, placed in a vertical slot in the raised cylinder O of the table-wheel C, and pressed outwardly by a spring, g', the pin b projecting from the under side of cam-shaped spur-wheel H, and a cam or trigger, c, projecting from knife-carriage K, completes the mechanism necessary to operate the coring and slicing knife L, as described below.

When the machine is at rest, with the paring-knife F f thrown back, the carriage K, at the outer or left end of bar N, impales an apple on the fork M m m m. Then set the machine in motion by means of driving-wheel B. The knife F f commences paring at the outer end, as aforesaid. The table-wheel C, revolving, brings the dog a into contact with the pin b. Then both table-wheel C and cam-shaped spur-wheel H travel around together, drawing the carriage K forward, causing the coring and slicing knife L to strike and enter the apple, slicing it spirally and cutting out a cylindrical core, as common with this class of knives. This motion continues till the cam-trigger c advances against the dog a, releasing it from the pin b. Now, the spring g, which has been coiled up one turn, acts upon the rack-bar I through the cam-shaped spur-wheel H, throwing said rack-bar and coring and slicing knife carriage back to the starting-point, taking the apple along with it, also, sometimes, the core. If the core remains on the fork, it is removed, as hereinafter provided. The spur-wheel H is made cam-shaped, for the purpose of drawing up the carriage K rapidly until it enters the apple, and then slowly while slicing, the object of which is to throw the carriage K out a greater distance, and yet not draw it up so rapidly while slicing, as it would make the slices too thick.

It is evident that the cam-shaped spur-wheel H could be made fast to table-wheel C, or the latter work directly into the rack-bar I, and obtain the reverse motion by having a part of teeth on C or H cut away and a spring working directly against the carriage K; but the arrangement before described is preferable, it being more positive, and for several reasons better adapted to manufacture. The coring and slicing knife L has a full circular strip, S, extending around the core, with the edge toward the apple sharpened.

The knife L is composed of two elements— namely, a slicing-knife, R, and a circular core-cutter, S, with its advancing edge sharpened and so placed on or in connection with the slicing element R that the ring S follows behind, instead of going in advance of the slicer R. The advantage of this arrangement is evident—that is, when attention is drawn to the fact that in the one case the core is cut loose after the apple is sliced at a corresponding point, while in the other case the core is cut loose first or in advance of the slicer. Now, it is evident that in this latter arrangement the slicer would be liable to break the apple in two, or, at least, break off the last slice when the coring-ring has gone in advance and cut the entire core out. This form of knife makes a draw cut, and is of especial advantage when the knife strikes a seed or pod inclosing them, cutting its way more freely.

The fork M has tines $m\,m\,m$, arranged all on one side of the center, which makes the fork open on one side. The hub is made slanting toward the open side; hence it is evident that when the coring-knife has cut close to the tines and the core is left on the fork it will be shoved out of the fork when another apple is pressed on by riding up the incline of the hub.

The coring and slicing knife carriage may be provided with a set-screw to fasten it, if desired, in a position drawn forward, the coring-knife encircling the hub of fork M, in which position the apple would not be sliced or cored, as the trigger $c$ would hold the dog $a$ back, so that it would pass tooth $b$; also, a simple coring-tube can be attached in place of the corer and slicer, in which case the machine would pare and core only. Such a device need only be a similar arrangement to the knife L with the circular strip extended, making it a cylinder sufficiently long to pass through the apple—that is, remove knife L and replace with a tube such as shown, Fig. 6.

Having described my invention, what I claim as new, and desire to secure by Letters Patent, is—

1. The combination of the cam-shaped spur-wheel H and pin $b$ with the revolving table-wheel C, its dog $a$, and spring $g'$, together operating a reciprocating knife-carriage, K, substantially as described.

2. The cam-shaped spur-wheel H and rack-bar I, geared to correspond, for obtaining the irregular motion of coring and slicing knife L in a paring-machine, substantially as described.

3. The fork M $m\,m\,m$, with tines $m\,m\,m$, extending from a slanting base or hub, M', said tines being arranged on one side of the center, in order that the core may pass out at one side, substantially as described.

4. A coring and slicing knife, L, composed of a slicing-blade, R, and a coring-ring, S, connected together, the latter being sharpened on its advancing edge and set in the rear of slicing-blade, substantially as described.

5. The combination of frame A, driver B, pinion D, fork M, pinion C', table-wheel C, back gear, E, paring-knife F $f$, with spur-wheel H, rack-bar I, coring and slicing knife L, knife-carriage K, and guide-bar N, substantially as described.

ROBT. P. SCOTT.

Witnesses:
FRED SCHROEDER,
M. F. GREEN.